US005717739A

United States Patent [19]
Dyer et al.

[11] Patent Number: 5,717,739
[45] Date of Patent: Feb. 10, 1998

[54] METHODS AND APPARATUS FOR ENABLING AN OPERATOR TO PROVIDE PRE-RECORDED INFORMATION TO A CUSTOMER

[76] Inventors: Dwayne Dyer, 2051 Evelyn's Dr., Hollister, Calif. 95023; Emery Dyer, 731 S. Bateman La., Alpine, Utah 84004

[21] Appl. No.: 543,030

[22] Filed: Oct. 13, 1995

[51] Int. Cl.⁶ .................................. H04M 1/64
[52] U.S. Cl. .................... 379/67; 379/398; 379/412
[58] Field of Search .................. 379/67, 88, 89, 379/71, 72, 82, 84, 79, 76, 52, 265, 73, 74, 398, 412

[56] References Cited

U.S. PATENT DOCUMENTS

| | | | |
|---|---|---|---|
| 4,697,282 | 9/1987 | Winter et al. | 397/67 |
| 4,720,846 | 1/1988 | Hatori | 379/79 |
| 4,734,930 | 3/1988 | Quiros et al. | 379/88 |
| 4,908,845 | 3/1990 | Little | 379/52 |
| 4,918,322 | 4/1990 | Winter et al. | 379/88 |
| 5,029,198 | 7/1991 | Walpole et al. | 379/88 |
| 5,031,205 | 7/1991 | Phillips | 379/88 |
| 5,189,692 | 2/1993 | Ferrara | 379/88 |
| 5,218,633 | 6/1993 | Clagett et al. | 379/144 |
| 5,237,157 | 8/1993 | Kaplan | 235/375 |
| 5,305,375 | 4/1994 | Sagara et al. | 379/89 |
| 5,321,740 | 6/1994 | Gergorek et al. | 379/67 |
| 5,329,506 | 7/1994 | Kitta et al. | 369/32 |
| 5,454,036 | 9/1995 | Gleeman et al. | 379/88 |
| 5,487,102 | 1/1996 | Rothschild et al. | 379/67 |

*Primary Examiner*—Fan S Tsang
*Attorney, Agent, or Firm*—Workman, Nydegger & Seeley

[57] ABSTRACT

Methods and apparatus are provided for enabling an operator to provide pre-recorded information to a customer in an interactive manner. The methods and apparatus utilize an audio storage medium which contains one or more audio information segments that can be accessed and played by an audio device without playing any of the other audio information segments. The audio device is coupled directly to the telephone network via interface circuitry which, among other things, matches the impedance of the audio output of the device to the impedance of the telephone network. Once a telephone call has been established between the operator and the customer, if the customer desires more information, the operator utilizes the audio device to select the appropriate audio information segment from the audio storage medium. It is important to note that when the operator plays the selected segment, both the operator and the customer remain listening. After the segment has been played, the operator can follow up on the information played and answer any further questions the customer may have.

4 Claims, 3 Drawing Sheets

METHODS AND APPARATUS FOR ENABLING AN OPERATOR TO PROVIDE PRE-RECORDED INFORMATION TO A CUSTOMER

BACKGROUND OF THE INVENTION

1. The Field of the Invention

This invention relates generally to methods and systems for providing pre-recorded information to a customer, and more specifically, to methods and systems which allow an operator to provide pre-recorded audio information to a customer in an interactive manner.

2. Present State of the Art

In the modern business world, telephone communications have become a tool of strategic importance. The telephone essentially allows modern business to operate. Each day, countless businesses utilize the telephone system to conduct a broad range of business transactions.

With the pervasiveness of the telephone in our society, intense efforts have been undertaken to provide enhanced capability and functionality to the telephone system. For example, there has been an explosion in the number of cellular telephones and cellular telephone services available to individuals. These services attempt to free individuals from the confines of a permanent location and allow them to conduct business from remote locations or when mobile.

In order to increase the utility of telephones, a vast array of answering machines, voice mail, automated forwarding services, and the like have been developed. Each of these devices or services is intended to increase the usefulness of the telephone in a specific way. For example, in order to help operators or receptionists respond to incoming telephone calls, devices have been developed which answer the telephone and recite a standard greeting such as "Services Company, how may I direct your call." Some of these devices then allow the operator or receptionist to enter the conversation and converse with the calling individual. Still other companies, seeking to provide additional services or information to their customers, set up automated ordering systems where a customer may call and, by entering various codes from the telephone key pad, order various products or services.

Still other companies, rely heavily on the use of human operators in their business. For example, direct sales marketing, or telemarketing, is an increasingly large segment of the economy. These companies use the telephone as a primary means of contacting potential customers. The operators typically describe to the customers the products or services offered and answer or respond to any questions the customer may have. This method, however, necessarily requires that each operator working for the company be trained and knowledgeable regarding all aspects of the products or services offered in order to answer any potential question a customer may have. This training must be thorough enough to instill in the customer confidence that the operator is a credible source of information regarding the products or services offered.

If a customer cannot receive satisfactory answers to his or her questions from a knowledgeable, credible source, the sales of the company will suffer. Unfortunately, training each and every operator thoroughly enough to instill such knowledge and confidence is a difficult and expensive undertaking. It often takes a very long time in order to develop such knowledge and credibility. The mover rate of operators can be quite high, thus significantly increasing the difficulty of providing a knowledgeable and trained staff of operators. Currently, few methods exist to overcome this obstacle.

Some companies, in an effort to overcome this obstacle, have resorted to multiple layers of operators. For example, if an initial operator lacks the experience or knowledge to answer a customer's question, the customer may be transferred to a supervisor who has a higher level of knowledge or skill in answering the question. While this method has the advantage of reducing the need to train every operator in all aspects of the products or services offered, it also has several drawbacks. Sometimes, customers do not wish to take the time to speak with a supervisor. They may instead elect to terminate the encounter. This results in lost sales to the company. Additionally, some customers may lose confidence in the ability of the company to provide adequate and accurate information when their questions cannot be immediately answered. Again this may result in lost sales. Finally, this method can suffer if an unusually large number of questions must be referred to a supervisor in a very short period of time. Such a situation can overwhelm the supervisor's ability to deal with the questions in a timely fashion. Again, customers may choose to terminate the discussion rather than wait for further answers to their questions.

Direct marketing companies are not the only businesses to suffer these problems. Companies which market products often have a help or support line where customers can call with questions or problems they are experiencing. These customer support lines provide a valuable service to the customer and often enhance the ability of the company to compete in the market place. Unfortunately, staffing such help lines can be very expensive. As with direct marketing companies, the operators staffing the support lines must be thoroughly trained in all aspects of the product. If they receive questions which cannot be answered, problems similar to those described above may occur. Customers may become frustrated and lose confidence in the ability of the company to support their own product. As a result reputation and business can suffer.

Currently, there exist no system which can help an operator provide accurate and credible information to a customer raising questions that the operator is not prepared or qualified to handle. It would, therefore, represent an advancement in the art to provide a system which allows accurate and credible information to be presented to the customer in a manner which they will readily accept. It would also represent an advancement in the art to provide a method for utilizing the skills of more knowledgeable operators in a manner which benefits the less experienced operators.

SUMMARY AND OBJECTS OF THE INVENTION

It is, therefore, an object of this invention to provide a low cost, reliable method to provide accurate and credible information to a customer during a previously established telephone call.

It is a further object of this invention to capitalize on the knowledge and experience of highly trained individuals in order to benefit less experienced operators.

Yet another object of the present invention is to interactively provide desired information from a credible source so that a customer's questions may be timely and accurately answered.

Still another object the present invention is to reduce the mount of training required for customer support staff operators in a direct marketing company, or other similar position.

A still further object of the present invention is to allow a company to standardize certain responses to customers so that all customers are provided with a uniformly accurate answer.

Additional objects and advantages of the invention will be set forth in the description which follows, and in part will be obvious from the description, or may be learned by the practice of the invention. The objects an advantages of the invention may be realized and obtained by means of the instruments and combinations particularly pointed out in the appended claims.

To achieve the foregoing objects, and in accordance with the invention as embodied and broadly described herein a system enabling an operator to provide pre-recorded information to a customer during the course of a telephone conversation is provided. Broadly speaking, the system utilizes an audio storage medium which contains one or more audio information segments that can be accessed and played without playing any of the other audio information segments. The audio storage medium is played with an audio device which allows one or more of the audio information segments stored on the storage medium to be randomly accessed and played. The audio device is coupled directly to the telephone network via interface circuitry which, among other things, matches the impedance of the audio output of the device to the impedance of the telephone network. The system is completed with a telephone which is also connected directly to the telephone network, and not through the interface circuitry of the audio selection and playing device.

Use of the system proceeds as follows. A telephone call between the operator and the customer is initiated using the telephone in a conventional manner. Once the telephone call has been established between the operator and the customer, if the customer desires more information, the operator utilizes the audio device to select the appropriate audio information segment from the audio storage medium. The operator then plays the selected segment while both the operator and the customer are listening. After the segment has been played, the operator can follow up on the information played and answer any further questions the customer may have. The customer may interrupt and the segment can be stopped to allow the operator to converse with the customer.

A central feature of the system as described is the interactiveness of the system. Because both the operator and the customer are listening to the audio information segment as it is played, if the customer interrupts the audio segment, the operator can quickly stop the remainder of the segment from being played. At this point the operator and the customer can converse and, if desired, the segment can be finished or a new segment can be played.

From this description, it will be apparent that the audio information stored on the storage medium can contain any type of information desired. Similarly, the information can be recorded from any source. Thus, experts in a particular field may record audio information segments. This will allow the customer to obtain information directly from a knowledgeable and credible source that would not otherwise be available to provide information to the customer during the conversation. This allows highly trained individuals to assist less experienced operators in an efficient manner.

These and other objects and features of the present invention will become more fully apparent from the following description and appended claims, or maybe learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
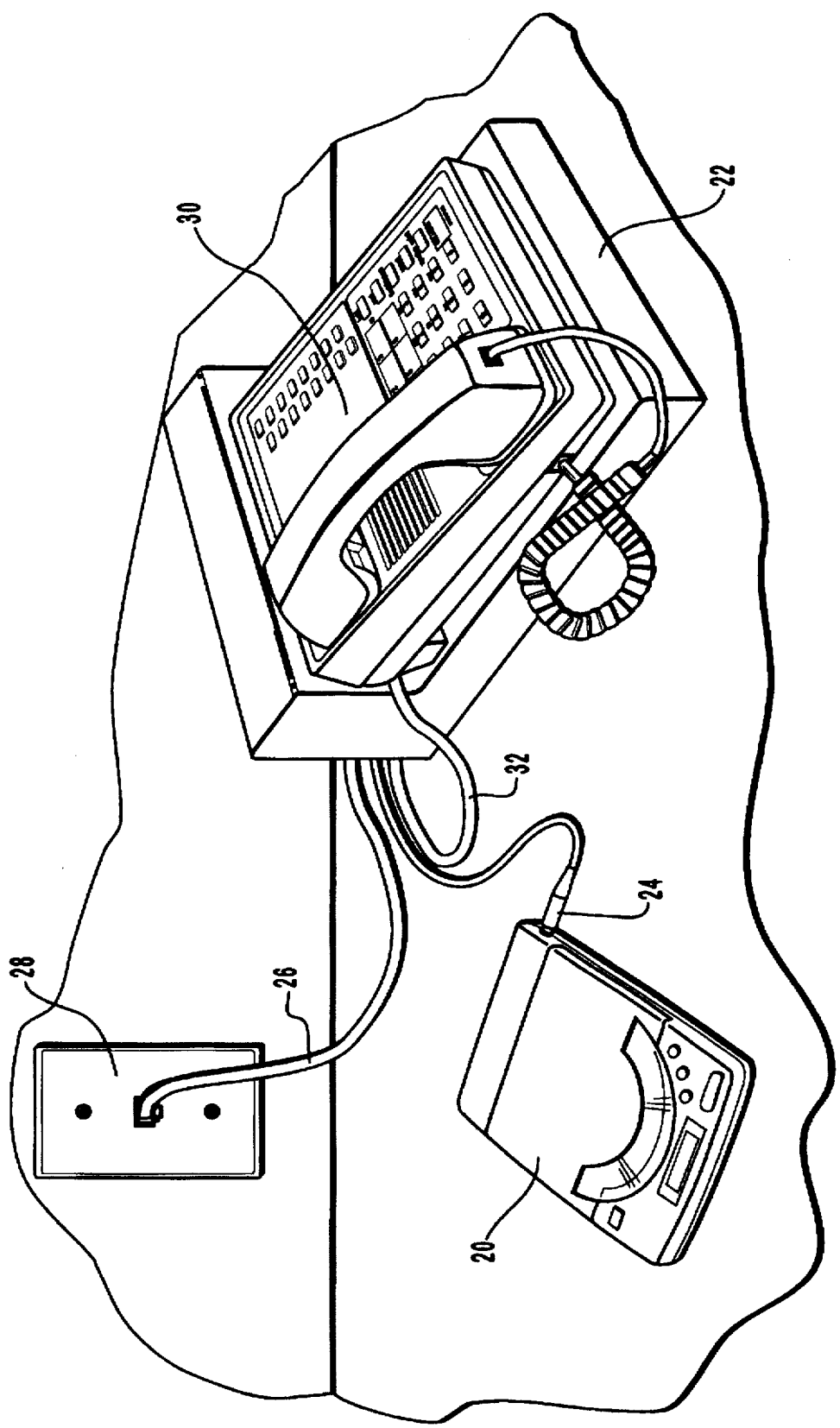
FIG. 1 is a perspective of the system showing the connections between various components.

Referring first to FIG. 1, an overall depiction of one preferred embodiment of the present invention is illustrated. The system generally comprises audio storage means for storing a plurality of audio information segments, select and play means for allowing an operator to select and play designated audio information segments, interface means for interfacing the select and play means directly to a telephone network, and a telephone.

In FIG. 1, the select and play means for allowing the operator to select and play designated audio information segments comprises audio compact disk player 20. In operation, audio compact disk player 20 will hold an audio compact disk (not shown) which contains a plurality of audio information segments stored on one or more of the compact disk tracks. By storing audio information segments on compact disk tracks, the appropriate audio information segment can be quickly located by an operator utilizing the track selection controls of the audio compact disk player. Obviously, an audio compact disk player which holds multiple compact disks can also be used if the number of audio information segments desired exceeds the number that can be stored on a single compact disk.

While FIG. 1 depicts the use of an audio compact disk player, those skilled in the art will realize that the select and play means for allowing the operator to select and play designated audio information segments can comprise a wide variety of commercially available audio players. By way of example, and not limitation, other suitable devices include a standard audio cassette player, a digital audio cassette player, or other devices capable of reading magnetic or other media such as magnetic 3.5" disks, tapes, or digitized solid state information.

In one embodiment a computer having integrated telephony capabilities can be used instead of the telephone/audio player combination. In this embodiment a user could converse with a customer using the build-in telephony capabilities of the computer. The audio information segments could then be stored in the computer, either in solid state memory or magnetic or optical disk. The user can then select and play a designated audio information segment through the computer. This embodiment may also be extremely useful where networked computers are used to communicate such as over the Interact. In such an environment, the information segments could be audio, text, pictures, video, or any other type of information that the computers were equipped to handle.

While the most common use for this invention is to transfer audio information over the telephone line, the invention is not so limited. Technologies are emerging that allow both audio and video to be transferred over communication lines. For example, multimedia capabilities exist for computers that allow full motion video to be played on a computer screen. Such full motion video, including accompanying audio, may one day be able to be transferred into every home like a telephone call is today. In such an environment, a player which transfers both audio and video may be used to transfer full motion video to a customer. Thus, although the discussion contained herein refers to audio information, the invention should not be so constrained.

When evaluating the suitability of an audio player to this invention, there are several characteristics that should be evaluated. The central characteristic of a suitable device includes a storage medium which is capable of storing a plurality of audio or other information segments so that individual audio information segments can be accessed and played without playing any remaining information segments. Thus, audio devices such as a compact disk which stores audio information segments on tracks that can be randomly accessed are particularly well suited to this application. On the other hand, audio tape players having a counter or other indicator in order to locate a desired audio information segment can also be used. It is also preferred that the audio player be commercially available at a reasonable cost in order to minimize the capital investment needed for the system. Finally, to minimize the complexity of any associated interface circuitry, it is desired that the audio player have a standard audio output jack such as the miniature stereo jacks used on audio compact disk players or audio tape players.

In order to interface the select and play means directly to the telephone network, interface means accomplishing such a purpose are included. In FIG. 1, such interface means is illustrated by interface unit 22. Although a wide variety of technologies can be used to create such an interface unit, the presently preferred embodiment utilizes discrete components to minimize the overall production costs as more fully described hereafter.

The purpose of interface unit 22 is to interface audio compact disk player 20 to the telephone network. In FIG. 1, interface unit 22 is provided with stereo plug 24. Stereo plug 24 will connect to a stereo jack of audio compact disk player 20. On the back of interface unit 22 is located a standard RJ-11 jack (not shown) so as to allow connection of audio compact disk player 20 to the telephone network via a standard RJ-11 cord 26. This will connect interface unit 22 directly to a standard telephone wall jack 28.

In FIG. 1, telephone unit 30 completes the system. Telephone unit 30 is connected into the telephone network via an RJ-11 telephone cord 32 which plugs into a second RJ-11 jack (not shown) on the back of interface unit 22.

Figure 2:
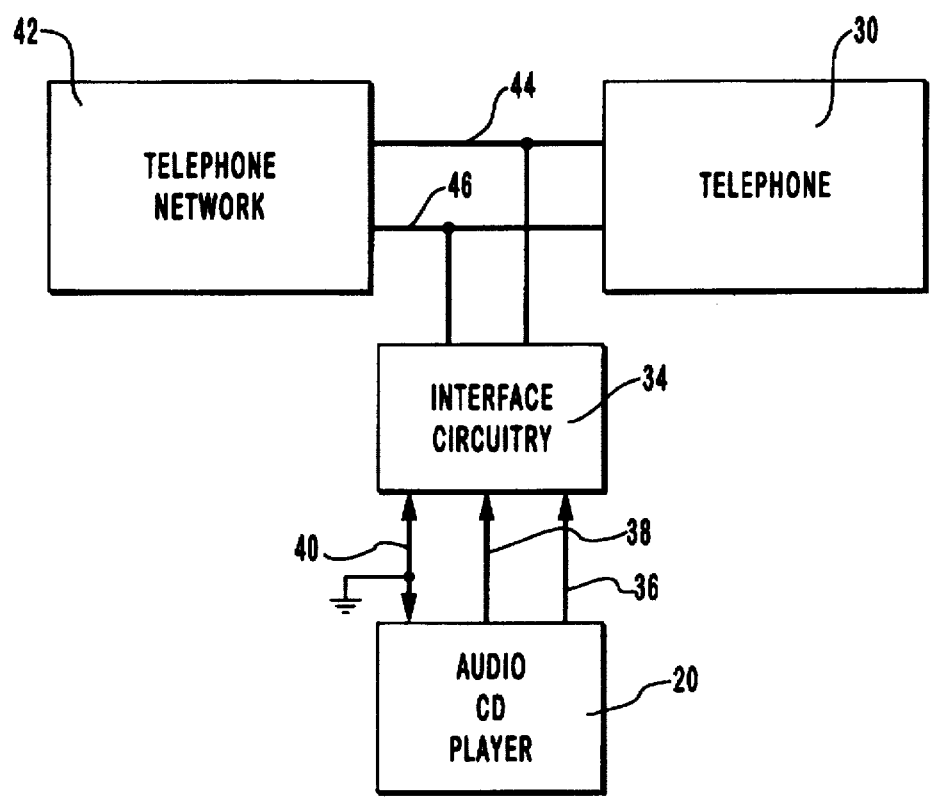
FIG. 2 is a block diagram of the system illustrating how the components are connected into the telephone network.

FIG. 2 illustrates the various electrical connections between the components of the system. In FIG. 2, audio compact disk player 20 is connected to the telephone network via interface circuitry 34. Interface circuitry 34 represents the working components of interface unit 22 of FIG. 1. In FIG. 2, audio compact disk player 20 is shown connected to interface circuitry 34 via a three conductor interface. The three conductor interface comprises left audio channel output 36, right audio channel output 38, and audio ground 40. Those skilled in the art will recognize that this three conductor interface represents a standard stereo audio output of a commercially available audio player. In addition to the stereo audio interface shown in FIG. 2, a non-stereo, or mono, interface can also be used if the audio player and/or audio storage medium are not stereo devices or if the audio information is recorded on one stereo track of the audio storage medium. Such a device would comprise an audio ground conductor and audio channel output conductor.

Returning to FIG. 2, interface circuitry 34 connects to telephone network 42 via tip line 44 and ring line 46. Those skilled in the art will recognize that these two lines represent the standard two conductor interface used by common telephones.

In order to complete the system, telephone unit 30 is also connected to telephone network 42 via tip line 44 and ring line 46. As illustrated in FIG. 2, telephone unit 30 is connected directly into telephone network 42 and not connected into telephone network 42 via interface circuitry 34. This connection scheme helps to minimize the cost and complexity of interface circuitry 34. As more fully explained in conjunction with the interface circuitry diagram illustrated in FIG. 3, this allows interface circuitry 34 to be constructed without the traditional interface circuitry normally included in a telephone unit. Such a simplified interface necessarily costs less than a more complex interface which must also handle a telephone unit. Thus, a cost savings can be realized by connecting telephone unit 30 directly to telephone network 42 and connecting audio compact disk player 20 to telephone network 42 via interface circuitry 34.

With the connection arrangement illustrated in FIG. 2, it is apparent to those of skill in the art that interface circuitry 34 must, among other things, match the impedance of audio compact disk player 20 and telephone network 42. A wide variety of technologies and methods are available to match impedances. Such methods include transmission line stub methods, active component methods, and resistor, capacitor, and inductor network methods.

Figure 3:
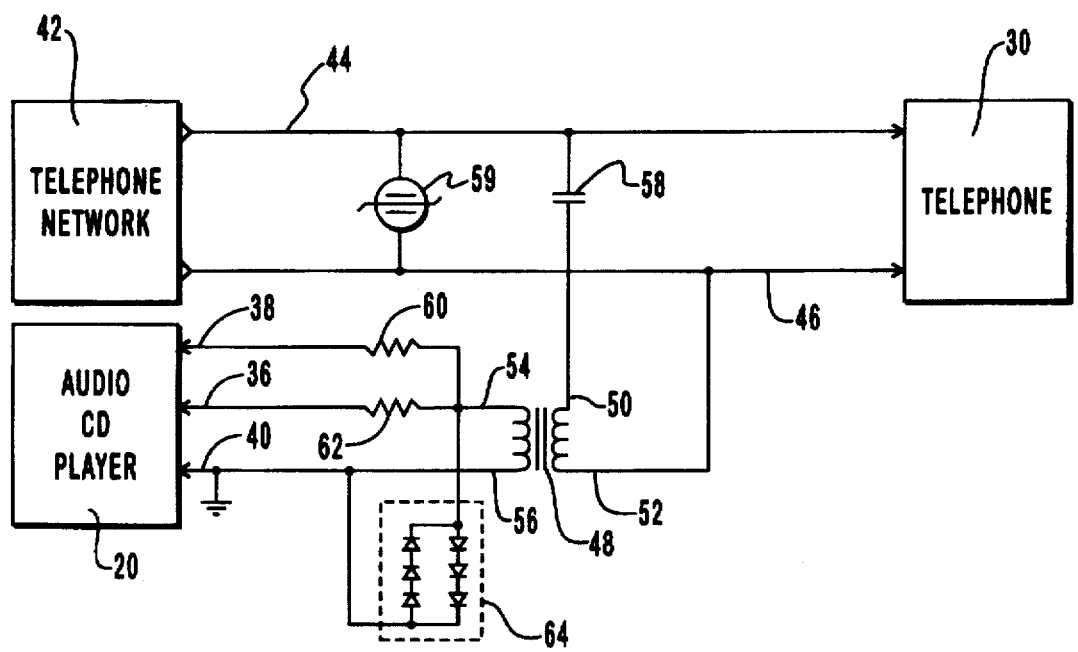
FIG. 3 is one preferred embodiment of the interface circuitry.

Referring next to FIG. 3, the details of one preferred embodiment of interface circuitry 34 is illustrated. In the embodiment illustrated in FIG. 3, the primary means of matching the impedance of audio compact disk player 20 to telephone network 42 is impedance matching transformer 48. In one preferred embodiment, impedance matching transformer 48 has a primary impedance of 8 ohms and a secondary impedance of 500 ohms. Also, it is preferred that impedance matching transformer 48 have the following technical specifications:

| PARAMETER | VALUE |
| --- | --- |
| Frequency Response | 300 Hz to 3500 Hz, ± .05 dB |
| Longitudinal Balance | 45 dB minimum |
| Return Loss | 26 dB minimum |
| Distortion | 0.5% maximum |
| Impedance Matching | ± 10% over the frequency range |
| Power Level | − 45 dBm to + 7 dBm |

As illustrated in FIG. 3, the secondary of impedance matching transformer 48 has two terminals labeled 50 and 52. The primary of impedance matching transformer 48 also has two terminals labeled 54 and 56. In FIG. 3, terminals 54 and 50 have the same polarity and terminals 56 and 52 have the same polarity. Secondary terminal 52 is connected to ring line 46. Secondary terminal 50 is connected to tip line 44 through capacitor 58. Capacitor 58 is preferably a 0.1 microfarad capacitor with a 250 volt AC rating.

In order to provide transient protection, it is preferable to include varistor 59 between top line 44 and ting line 46. Varistor 59 preferably has a 250 volt rating.

Turning next to the connections between the primary winding of transformer 48 and audio compact disk player 20, we see that primary terminal 56 is connected to audio ground 40. Right audio channel output 38 is connected to primary terminal 54 through resistor 60. Left audio channel output 36 is also connected to primary terminal 54 through resistor 62. Resistors 60 and 62 preferably have a value of 8 ohms.

While one of the functions that interface circuitry 34 performs is to match the impedance between audio compact disk player 20 and telephone network 42, other important considerations must be taken into account when designing interface circuitry 34. The voltages on tip line 44 and ring line 46 can be very large. In certain conditions these voltages may extend into the hundreds of volts. The audio outputs of audio compact disk player 20, on the other hand, are designed to operate at a fraction of that voltage. Thus, care must be taken in order to not exceed a predefined voltage range on the audio output channels of audio compact disk player 20. Failure to consider these problems will result in damage to the audio output channels of audio compact disk player 20. It is, therefore, preferable to include clamping means for clamping the electrical signal on the audio output channels of audio compact disk player 20 so that the voltage remains within a predefined range. In FIG. 3, such clamping means would be connected between primary terminal 54 and primary terminal 56. Such a clamping means, located across these two terminals, will prevent the voltage between left audio channel output 36 and right audio channel output 38 from exceeding audio ground 40 by a predetermined amount. By way of example, and not limitation, in FIG. 3 such clamping means comprises diode circuit 64.

In FIG. 3, diode circuit 64 comprises six diodes connected in a parallel circuit arrangement. As illustrated in FIG. 3, three diodes are connected in series so the anode of one diode is connected to the cathode of another diode. The three diodes form a series circuit having an overall anode and an overall cathode. By connecting two such series circuits in parallel so that the overall anode of one series circuit is connected to the overall cathode of the other series circuit the desired diode circuit is formed.

Diode circuit 64 prevents the voltage between primary terminal 54 and primary terminal 56 from exceeding the voltage drop across three diodes in either the positive voltage or negative voltage direction. The clamping circuit thus protects left audio channel output 36 and right audio channel output 38 from large voltage values which may be transferred from tip line 44 and ring line 46 across impedance transformer 48.

Figure 4:
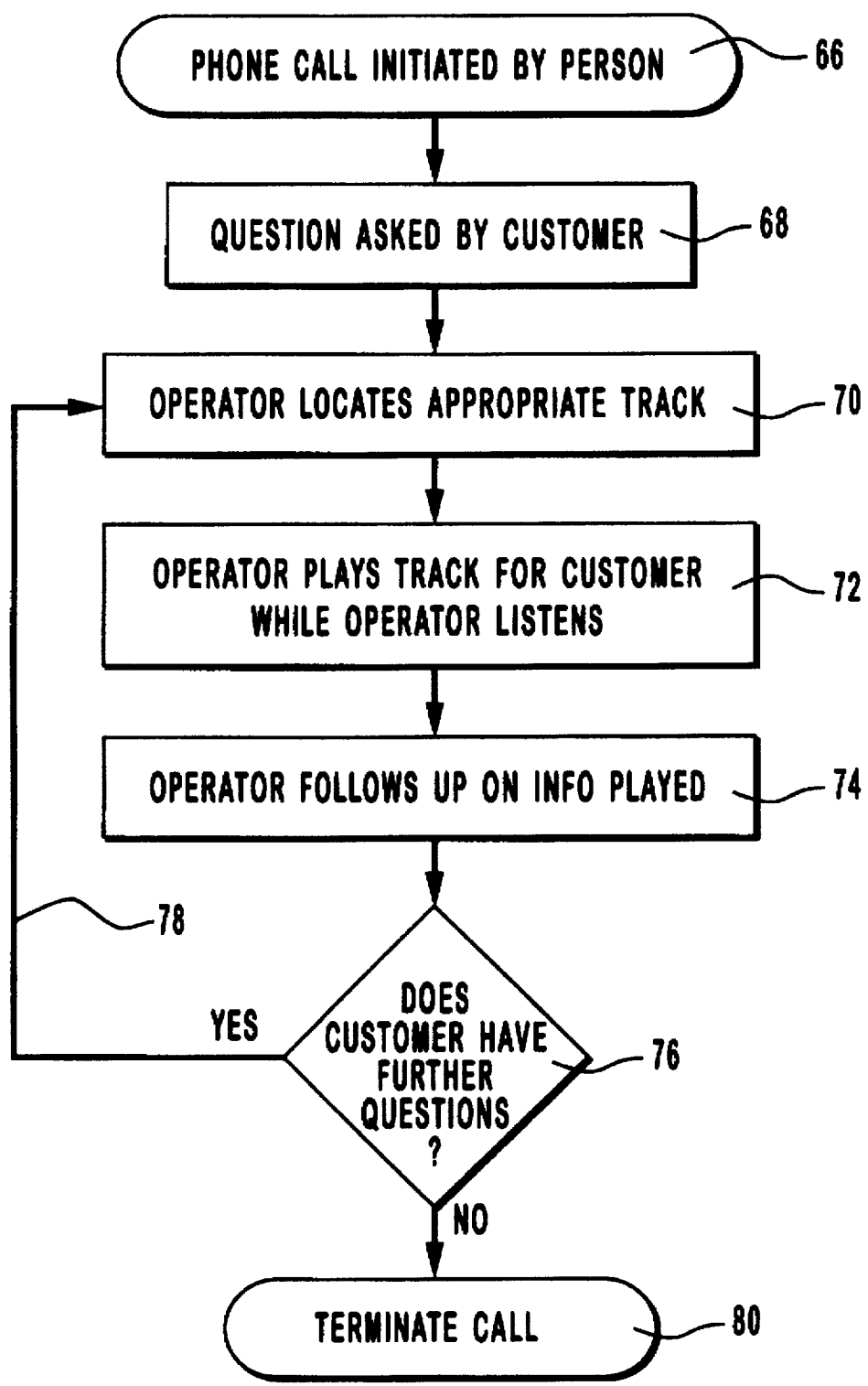
FIG. 4 illustrates a method of providing pre-recorded information from a third party during a telephone conversation between an operator and a customer.

Turning next to FIG. 4, a process for using the inventive system is disclosed. In FIG. 4, the process is begun by an individual initiating a telephone call to another individual using the telephone in a convention method manner. This is illustrated by Step 66. Because the telephone unit is connected directly into the telephone network and not through interface circuitry 34, an operator using the system can initiate a telephone call in a conventional manner without worrying about any additional circuitry or procedures. Furthermore, it allows a customer calling an individual using the inventive system to initiate a telephone call in the conventional manner.

After the telephone call has been initiated, a conversation ensues between two or more parties. As used within the scope of this invention, the phrase "previously initiated phone conversation" is used to distinguish a telephone conversation that has already been initiated between two or more parties. This means that preliminary greetings have already been exchanged and all parties are ready to proceed to the substance of the conversation.

After a telephone conversation has been initiated between at least one customer and at least one operator, a customer may ask a question that an operator may need to answer. This is illustrated in FIG. 4 by Step 68. If the operator chooses to respond to the question using the inventive system so that reliable, credible information can be provided to the customer, the operator locates the appropriate audio information segment to be played. This is illustrated in FIG. 4 by Step 70. The operator locates the appropriate audio information segment using the controls on the audio player. In other words, if the audio player is an audio compact disk player the operator locates the appropriate compact disk track which contains the appropriate audio information segment.

Once the appropriate audio information segment has been located, the operator then plays the audio information segment for the customer while all parties to the conversation listen to the audio information segment through their telephone handsets. This event is illustrated in FIG. 4 by Step 72. Because of the interactive nature of the system, and because all parties to the conversation are listening to the audio information segment as it is played, if the customer interrupts the information, the operator may quickly stop the playback using the appropriate controls located on the audio player. If an audio information segment is interrupted, play can resume from the point of interruption or another audio information segment can be played.

After the desired information has been played for the customer, the operator can follow up on the information which has been played. In other words, the operator can converse with the customer to determine whether the information has answered the customer's questions or whether further information is desired. This is illustrated in FIG. 4 by Step 74. If the customer has further questions, the operator can locate an appropriate audio information segment to answer the customer's questions and play the desired segment. This is illustrated in FIG. 4 by "yes" branch 78 from Step 76.

If the customer does not desire further audio information segments to be played, but still desires further information, other appropriate action can be taken. For example, the operator may attempt to answer further questions without using recorded audio information segments, or may transfer the customer to a different operator.

If the customer does not desire further information, and all other business has been concluded, the telephone call may be terminated. In FIG. 4, this is illustrated by Step 80.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for enabling an operator to provide pre-recorded information to a customer during the course of a telephone call, the system comprising:

a) an audio storage disk for storing a plurality of audio information segments in a format which allows random access to any one of the plurality of audio information segments so that a single audio information segment to be accessed and played from the audio storage disk without playing any of the remaining audio information segments;

b) an audio disk player capable of allowing the operator to select and play designated audio information segments stored on the audio storage disk, said audio disk player having at least one audio output channel;

c) interface means for interfacing the at least one audio output channel of the audio disk player directly to a telephone network so that the played information segments can be heard through the telephone handsets of all parties to a previously established telephone call, said interface means comprising clamping means for clamping signals to or from the at least one audio output channel to a predetermined level in order to provide protection to the at least one audio output channel of the audio disk player; and d) a telephone connected directly to the telephone network and not through the interface means.

2. A system as defined in claim 1, wherein the interface means comprises means to match the impedance of the telephone network and the audio disk player.

3. A system as defined in claim 2, wherein the audio disk player has a first audio channel output, a second audio channel output, and an audio ground, and wherein the telephone network has a tip line and a ring line, and wherein the means to match the impedance comprises:

a) a transformer having a primary side and a secondary side, each side having a first terminal and a second terminal:

b) a capacitor, connected between the first terminal of the secondary side of the transformer and the tip line of the telephone network, the second terminal of the secondary side of the transformer being connected to the ring line of the telephone network;

c) a first resistor connected in series between the first terminal of the primary side of the transformer and the first audio channel output of the audio disk player, the other terminal of the secondary side of the transformer being connected to the audio ground;

d) a second resistor connected in series between the first terminal of the primary side of the transformer and the second audio channel output of the audio disk player;

e) and wherein the clamping means has a first terminal and a second terminal, the clamping means being connected in parallel between the first terminal of the primary side of the transformer and the second terminal of the primary side of the transformer so that the first terminal of said clamping means is connected to the first audio channel output through the first resistor and the first terminal of said clamping means is also connected to the second audio channel output through the second resistor and the second terminal of said clamping means is connected to the audio ground.

4. A system as defined in claim 3, wherein the clamping means comprises:

a) a first series circuit having three diodes connected in series so the anode of one diode is connected to the cathode of another diode, the first series circuit having an overall anode and an overall cathode;

b) a second series circuit having three diodes connected in series so the anode of one diode is connected to the cathode of another diode, the second series circuit having an overall anode and an overall cathode; and c) the first and second series circuits being connected in parallel so that the overall anode of the first series circuit is connected to the overall cathode of the second series circuit so that a first terminal is formed and the overall cathode of the first series circuit is connected to the overall anode of the second series circuit so that a second terminal is formed.

\* \* \* \* \*